(12) United States Patent
Avudaiyappan et al.

(10) Patent No.: US 10,296,432 B2
(45) Date of Patent: *May 21, 2019

(54) SYSTEMS AND METHODS FOR INVASIVE DEBUG OF A PROCESSOR WITHOUT PROCESSOR EXECUTION OF INSTRUCTIONS

(71) Applicant: Intel Corporation, Santa Clara, CA (US)

(72) Inventors: Karthikeyan Avudaiyappan, Sunnyvale, CA (US); Brian McGee, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 15/586,019

(22) Filed: May 3, 2017

(65) Prior Publication Data

US 2017/0235656 A1 Aug. 17, 2017

Related U.S. Application Data

(63) Continuation of application No. 13/970,344, filed on Aug. 19, 2013, now Pat. No. 9,665,468.

(51) Int. Cl.
*G06F 11/00* (2006.01)
*G06F 11/26* (2006.01)
*G06F 11/36* (2006.01)
*G06F 11/22* (2006.01)

(52) U.S. Cl.
CPC .......... *G06F 11/26* (2013.01); *G06F 11/2236* (2013.01); *G06F 11/3656* (2013.01); *G06F 11/3648* (2013.01)

(58) Field of Classification Search
CPC .................. G06F 11/26; G06F 11/263; G06F 11/273–2736; G06F 11/2236; G06F 11/3648; G06F 11/3656; G01R 31/31705
See application file for complete search history.

(56) References Cited

U.S. PATENT DOCUMENTS

| 4,847,758 | A | | 7/1989 | Olson et al. |
| 4,858,111 | A | | 8/1989 | Steps |
| 5,301,287 | A | | 4/1994 | Herrell et al. |
| 5,513,344 | A | | 4/1996 | Nakamura |
| 5,590,354 | A | | 12/1996 | Klapproth et al. |
| 5,603,010 | A | | 2/1997 | Dodd et al. |
| 5,729,767 | A | * | 3/1998 | Jones .................... G06F 11/073 710/100 |

(Continued)

OTHER PUBLICATIONS

Final Office Action from U.S. Appl. No. 13/970,344, dated Nov. 18, 2016, 16 pages.

(Continued)

*Primary Examiner* — Michael Maskulinski
(74) *Attorney, Agent, or Firm* — NDWE, LLP

(57) ABSTRACT

Methods for invasive debug of a processor without processor execution of instructions are disclosed. As a part of a method, a memory mapped I/O of the processor is accessed using a debug bus and an operation is initiated that causes a debug port to gain access to registers of the processor using the memory mapped I/O. The invasive debug of the processor is executed from the debug port via registers of the processor.

20 Claims, 4 Drawing Sheets

(56) References Cited

U.S. PATENT DOCUMENTS

| | | | |
|---|---|---|---|
| 5,767,856 | A | 6/1998 | Peterson et al. |
| 5,920,889 | A | 7/1999 | Petrick et al. |
| 5,983,332 | A | 11/1999 | Watkins |
| 6,021,485 | A | 2/2000 | Feiste et al. |
| 6,141,747 | A | 10/2000 | Witt |
| 6,215,497 | B1 | 4/2001 | Leung |
| 6,366,984 | B1 | 4/2002 | Carmean et al. |
| 6,401,192 | B1 | 6/2002 | Schroter et al. |
| 6,457,075 | B1 | 9/2002 | Koutsoures |
| 6,505,277 | B1 | 1/2003 | Arimilli et al. |
| 6,556,473 | B2 | 4/2003 | Saito et al. |
| 7,177,985 | B1 | 2/2007 | Diefendorff |
| 7,334,108 | B1 | 2/2008 | Case et al. |
| 7,343,477 | B1 | 3/2008 | Thatipelli et al. |
| 7,594,079 | B2 | 9/2009 | Yu et al. |
| 2001/0013870 | A1 | 8/2001 | Pentkovski et al. |
| 2002/0133794 | A1* | 9/2002 | Kanapathippillai ............... G01R 31/31705 716/136 |
| 2002/0169935 | A1 | 11/2002 | Krick et al. |
| 2003/0005226 | A1 | 1/2003 | Hong |
| 2003/0018875 | A1 | 1/2003 | Henry et al. |
| 2003/0056066 | A1 | 3/2003 | Chaudhry et al. |
| 2006/0031641 | A1 | 2/2006 | Hataida et al. |
| 2006/0179284 | A1 | 8/2006 | Jensen et al. |
| 2007/0168746 | A1* | 7/2007 | Righi ............... G06F 11/3656 714/38.11 |
| 2007/0288725 | A1 | 12/2007 | Luick |
| 2009/0089510 | A1 | 4/2009 | Lee et al. |
| 2009/0150622 | A1 | 6/2009 | Allen, Jr. et al. |
| 2010/0011166 | A1 | 1/2010 | Yu et al. |
| 2010/0049952 | A1 | 2/2010 | Eddy et al. |
| 2011/0040955 | A1 | 2/2011 | Hooker et al. |
| 2011/0145513 | A1 | 6/2011 | Iyer et al. |
| 2012/0072667 | A1 | 3/2012 | Anderson et al. |
| 2012/0079254 | A1* | 3/2012 | Williams ............ G06F 11/3648 712/227 |
| 2014/0013027 | A1 | 1/2014 | Jannyavula et al. |
| 2014/0095784 | A1 | 4/2014 | Tran et al. |
| 2014/0173343 | A1 | 6/2014 | Ahmed et al. |
| 2014/0205012 | A1 | 7/2014 | Lee et al. |
| 2014/0281722 | A1 | 9/2014 | Kraipak et al. |
| 2014/0317357 | A1 | 10/2014 | Kaplan et al. |

OTHER PUBLICATIONS

Final Office Action from U.S. Appl. No. 13/970,344, dated Oct. 21, 2015, 24 pages.

Non-Final Office Action from U.S. Appl. No. 13/970,344, dated Apr. 28, 2015, 12 pages.

Non-Final Office Action from U.S. Appl. No. 13/970,344, dated Jun. 14, 2016, 17 pages.

Notice of Allowance from U.S. Appl. No. 13/970,344, dated Jan. 26, 2017, 8 pages.

* cited by examiner

101

SYSTEMS AND METHODS FOR INVASIVE DEBUG OF A PROCESSOR WITHOUT PROCESSOR EXECUTION OF INSTRUCTIONS

CROSS-REFERENCE TO RELATED APPLICATIONS

This application is a continuation of application Ser. No. 13/970,344, filed Aug. 19, 2013 (now U.S. Pat. No. 9,665,468, issued May 30, 2017), which is hereby incorporated by reference.

FIELD

The embodiments relate to a system and method for debugging a processor without the processor having to execute instructions related to the debugging process.

BACKGROUND

A debugger or debugging tool is a computer program that is used to test and debug other programs (e.g., the target program). A "crash" happens when the program cannot normally continue because it has encountered a programming bug. When the program crashes or reaches a preset condition, the debugger typically identifies the location in the original code that caused the crash if it is a source-level debugger or symbolic debugger. If it is a low-level debugger or a machine-language debugger it identifies the line in the disassembly (unless it also has online access to the original source code and can display the appropriate section of code from the assembly or compilation).

Modern day processors have to be debugged in a system in a lab setting. Debug architecture requires that for an invasive debug operation, debugger software be executed by the processor under debug (PUD). If the functionality of processor under debug is compromised such that the processor is unable to run even the debugger software itself, then debug of such processor is impossible. Consequently, conventional approaches that rely on a potentially compromised PUD to execute debug instructions are inadequate.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
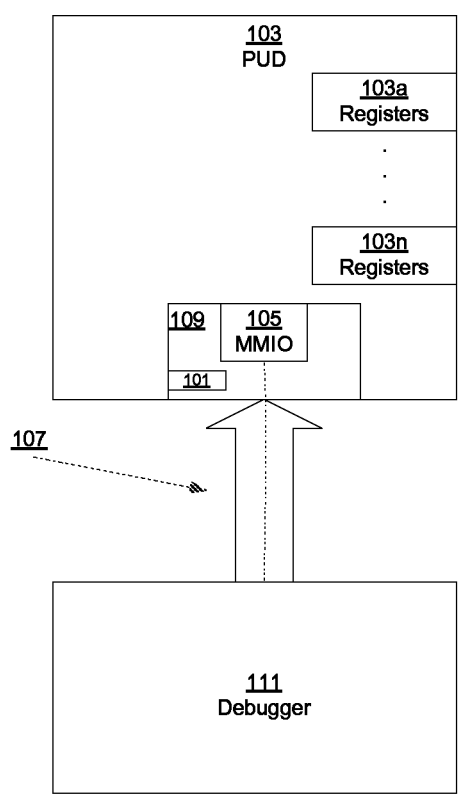
FIG. 1A shows an exemplary operating environment of a system for invasive debug of a processor without processor execution of instructions according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "initiating" or "executing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

A shortcoming of some conventional debugging tools is that they rely on potentially compromised processors to execute their own debug instructions. A method for invasive debug of a processor without processor execution of instructions is disclosed that addresses these shortcomings. As a part of a method, a memory mapped I/O of the processor is accessed via a debug bus and an operation is initiated that causes a debug port to gain access to registers of the processor using the memory mapped I/O. The invasive debug of the processor is executed from the debug port via registers of the processor. Accordingly, the debug port is able to execute an invasive debug of the processor that could otherwise only be performed through execution of instructions by the processor itself.

Exemplary Operating Environment of Systems and Methods for Invasive Debug of a Processor without Processor Execution of Instructions According to One Embodiment FIG. 1A shows an exemplary operating environment 100 of a system 101 for invasive debug of a processor without processor execution of instructions according to one embodiment. System 101 prompts an invasive debug of a processor that is to be debugged, from debug port 109 that could otherwise only be performed through execution of instructions by the processor itself. FIG. 1A shows system 101, PUD 103, processor registers 103a-103n, MMIO (memory-mapped I/O) 105, debug bus 107, debug port 109 and debugger 111.

Referring to FIG. 1A, PUD 103 is a processor that is undergoing debugging operations. In one embodiment, PUD 103 can be subjected to invasive debugging operations by debug port 109. The access of debug port 109 to the internal components of PUD 103 is facilitated by MMIO 105 which is located inside of PUD 103.

MMIO 105 is configured to initiate a process that makes debug port 109 the master component in debug operations. At this point, debug port 109 gains access to all of the registers of PUD 103. In one embodiment, when debug port 109 becomes master, it can initiate debug functions and features which are invasive in nature and that otherwise can only be performed by the execution of instructions by PUD 103.

Processor registers 103a-103n are system registers of PUD 103 into which data can be loaded and used for arithmetic, manipulated, or tested, by machine instruction. In one embodiment, system registers can include but are not limited to registers that are associated with PUD 103 memory management unit (MMU), front end components, cache components, etc. In one embodiment, when debug port 109 becomes the master component of the processor debug process, it gains access to all of the processor's system registers.

Referring to FIG. 1A, as a part of its operations, system 101, which in one embodiment can reside in debug port 109, causes the accessing of MMIO 105 of PUD 103, initiates an operation that causes debug port 109 to gain access to registers of PUD 103 (using MMIO 105), and with access to registers of PUD 103, causes an execution of an invasive debug of processor PUD 103. For example, access to system registers of PUD 103 can be used to implement diagnostic operations such as causing a value in a TLB to be accessed or causing a flushing of a cache line to main memory, etc.

Debugger 111 is a computer program that is used to test and debug PUD 103. In one embodiment, debugger 111 accesses MMIO 105 via debug bus 107 in order to trigger a mode of operation that is referred to herein as debug port control mode. In one embodiment, debugger 111 can indicate specific diagnostic operations that debug port 109 is to perform.

Operation

Figure 1B:
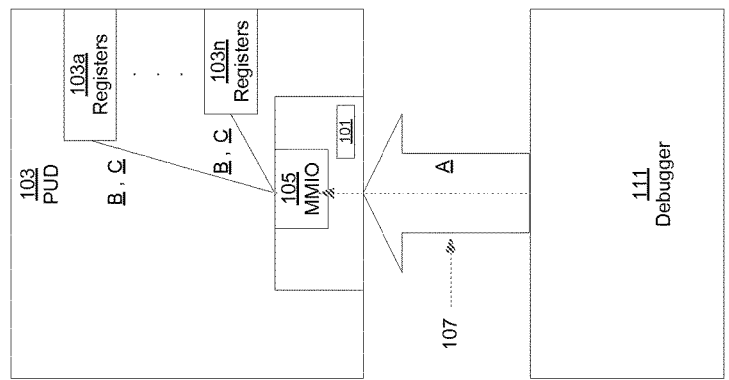
FIG. 1B illustrate operations performed by system for invasive debug of a processor without processor execution of instructions.

FIG. 1B illustrate operations performed by system 101 for invasive debug of a processor without processor execution of instructions. These operations, which relate to invasive debug of a processor without processor execution of instructions, are only exemplary. It should be appreciated that other operations not illustrated by FIG. 1B can be performed in accordance with one embodiment.

Referring to FIG. 1B, at A, via debug bus 107, MMIO 105 of PUD 103 is accessed by debugger 111 to trigger debug port control mode. In one embodiment, debugger 111 can indicate specific diagnostic operations that debug port 109 is to perform.

At B, using MMIO 105, an operation that causes debug port 109 to gain access to system registers of PUD 103 is performed.

At C, an invasive debug of PUD 103 is caused to be executed from debug port 109, based on the aforementioned access to system registers 103a-103n of PUD 103.

Figure 2:
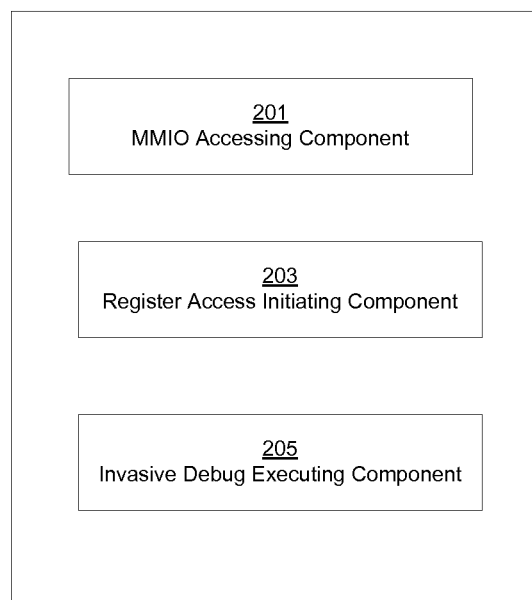
FIG. 2 shows components of a system for invasive debug of a processor without processor execution of instructions according to one embodiment.

Components of System for Invasive Debug of a Processor without Processor Execution of Instructions According to One Embodiment FIG. 2 shows components of a system 101 for invasive debug of a processor without processor execution of instructions according to one embodiment. In one embodiment, components of system 101 implement an algorithm for invasive debug of a processor without processor execution of instructions. In the FIG. 2 embodiment, components of system 101 include MMIO accessing component 201, register access initiating component 203 and invasive debug executing component 205.

MMIO accessing component 201 causes a memory mapped I/O (MMIO) of a PUD (e.g., 103 in FIG. 1A) to be accessed from a debug port (e.g., 109 in FIG. 1A). In one embodiment, access to internal components of the PUD (e.g., 103 in FIG. 1A), as is described herein, is made through the MMIO which is located inside of the PUD.

Register access initiating component 203 initiates an operation that causes the debug port to gain access to system registers of the PUD using the memory mapped I/O. In one embodiment, system registers of the PUD (e.g., processor registers 103a-103n in FIG. 1A) are storage components that are available as part of the PUD into which data can be loaded and used for arithmetic, manipulated, or tested, by machine instruction. In one embodiment, when the debug port (e.g., 109 in FIG. 1A) becomes the master component of the debug process it gains access to all of the PUDs system registers.

Invasive debug executing component 205 causes the execution of an invasive debug of the PUD from the debug port based on the aforementioned access to the system registers of the PUD. In one embodiment, when the debug interface becomes master, invasive debug executing component 205 can initiate debug functions and features which are invasive in nature and that otherwise can only be performed by the execution of instructions by the PUD.

It should be appreciated that the aforementioned components of system 101 can be implemented in hardware or software or in a combination of both. In one embodiment, components and operations of system 101 can be encompassed by components and operations of one or more computer components or programs (such as debug port 109 of FIG. 1A). In another embodiment, components and operations of system 101 can be separate from the afore-

Figure 3:
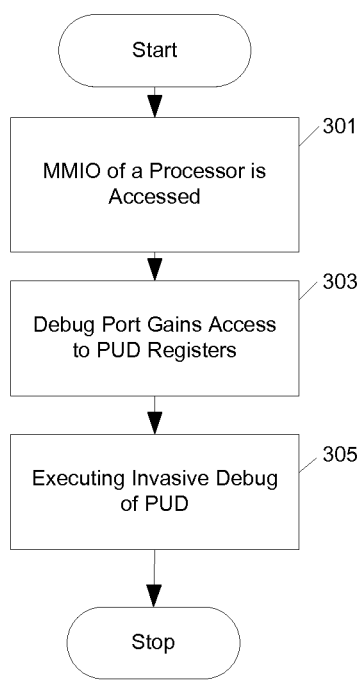
FIG. 3 shows a flowchart of the steps performed in a method for invasive debug of a processor without processor execution of instructions according to one embodiment.

Method for Invasive Debug of a Processor without Processor Execution of Instructions According to One Embodiment FIG. 3 shows a flowchart 300 of the steps performed in a method for invasive debug of a processor without processor execution of instructions according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301, via a debug bus, a memory mapped I/O of a PUD is accessed (such as by debugger 111 as is described herein with reference to FIG. 1A).

At 303, using the memory mapped I/O, an operation is initiated that causes the debug port to gain access to registers of the PUD.

At 305, from the debug port, and based on access to registers of the PUD, an invasive debug of the PUD is executed at the behest of a system for invasive debug of a processor (e.g., system 101 in FIG. 1A) that in one embodiment can reside in the debug port (e.g., debug port 109 in FIG. 1A). In other embodiments, the system for invasive debug of a processor can be separate from the debug port but can operate cooperatively therewith.

With regard to exemplary embodiments thereof, systems and methods for invasive debug of a processor without processor execution of instructions are disclosed. As a part of the method, a memory mapped I/O of the processor is accessed using a debug interface and an operation is initiated that causes the debug interface to gain access to registers of the processor using the memory mapped I/O. The invasive debug of the processor is executed from the debug interface via registers of the processor.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for invasive debug of a processor without processor execution of invasive debug operations, the method comprising:
   receiving an access request from a debugger over a debug bus;
   initiating access of a memory mapped I/O (MMIO) of the processor in a debug port of the processor;
   initiating debug port control mode using the memory mapped I/O, which causes the debug port to gain access to registers of the processor; and
   receiving from the debugger the invasive debug operations for the processor, without the processor executing the invasive debug operations.

2. The method of claim 1 wherein the debug port control mode makes the debug port master enabling the debug port to implement the invasive debug operations for the processor and to access processor registers.

3. The method of claim 1 wherein the debug port can initiate invasive debug operations using the registers of the processor.

4. The method of claim 1 wherein the invasive debug operations are performed without running software on the processor.

5. The method of claim 1 wherein the invasive debug operations are received from a debugger program.

6. The method of claim 1 wherein the invasive debug operations are diagnostic operations.

7. The method of claim 1 wherein the invasive debug operations are testing of the registers of the processor.

8. A device for invasive debug of a processor without processor execution of instructions, comprising:
   a memory accessing component to access a memory mapped input/output (I/O) of the processor;
   a register access initiating component to initiate a debug port control mode using the memory mapped I/O, which causes the debug port to gain access to registers of the processor; and
   an executing component to execute instructions from a debugger for invasive debug operations, without the processor executing the invasive debug operations.

9. The device of claim 8 wherein the memory accessing component triggers a debug port control mode that makes the debug port master enabling the debug port to implement the invasive debug operations for the processor and to access processor registers.

10. The device of claim 8 wherein the executing component can initiate invasive debug operations using the registers of the processor.

11. The device of claim 8 wherein the invasive debug operations are executed by the executing component without running software on the processor.

12. The device of claim 8 wherein the invasive debug operations are received by the executing component from a debugger program.

13. The device of claim 8 wherein the invasive debug operations executed by the executing component are diagnostic operations.

14. The device of claim 8 wherein the invasive debug operations executed by the executing component test the registers of the processor.

15. A processor comprising:
   registers to store data being executed or manipulated by execution units;
   execution units to execute instructions and manipulate data in the registers; and
   a debug port communicatively coupled to the registers and execution units, the debug port including a memory accessing component to access a memory mapped input/output (I/O) of the processor, a register access initiating component to initiate a debug port control mode using the memory mapped I/O, which causes the debug port to gain access to the registers, and an executing component to execute instructions from a debugger for invasive debug operations, without the processor executing the invasive debug operations via the execution units.

16. The processor of claim 15 wherein the memory accessing component triggers a debug port control mode that makes the debug port master enabling the debug port to implement the invasive debug operations for the processor and to access processor registers.

17. The processor of claim 15 wherein the executing component can initiate invasive debug operations using the registers of the processor.

18. The processor of claim 15 wherein the invasive debug operations are executed by the executing component without running software on the execution units.

19. The processor of claim 15 wherein the invasive debug operations are received by the executing component from a debugger program.

20. The processor of claim 15 wherein the invasive debug operations executed by the executing component are diagnostic operations.

\* \* \* \* \*